United States Patent [19]

Shimomura et al.

[11] Patent Number: 5,650,805
[45] Date of Patent: Jul. 22, 1997

[54] INK JET HEAD AND INK JET APPARATUS EMPLOYING THE SAME

[75] Inventors: Akihiko Shimomura, Yokohama; Shigeo Toganoh, Tokyo; Kazuaki Masuda, Kawasaki; Masanori Takenouchi, Yokohama; Kunihiko Maeoka, Kawasaki; Masahiko Higuma, Togane; Kenji Aono, Kokubunji; Yoichi Taneya; Masashi Miyagawa, both of Yokohama, all of Japan

[73] Assignee: Canon Kabushiki Kaisha, Japan

[21] Appl. No.: 322,156

[22] Filed: Oct. 13, 1994

[30] Foreign Application Priority Data

| Oct. 13, 1993 | [JP] | Japan | 5-255904 |
| Dec. 27, 1993 | [JP] | Japan | 5-330730 |
| Oct. 5, 1994 | [JP] | Japan | 6-241094 |

[51] Int. Cl.$^6$ .................................. B41J 2/15
[52] U.S. Cl. ........................................... 347/20
[58] Field of Search ................................. 347/20

[56] References Cited

U.S. PATENT DOCUMENTS

| 4,313,124 | 1/1982 | Hara | 346/140 R |
| 4,345,262 | 8/1982 | Shirato et al. | 346/140 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,013,383 | 5/1991 | Chapman | 156/307.3 |
| 5,451,992 | 9/1995 | Shimomura et al. | 347/45 |

FOREIGN PATENT DOCUMENTS

| 0372561A2 | 6/1990 | European Pat. Off. . |
| 0495678A2 | 7/1992 | European Pat. Off. . |
| 0677389A1 | 10/1995 | European Pat. Off. . |
| 4127195A1 | 2/1993 | Germany . |
| 46-30711 | 9/1971 | Japan . |
| 54-56847 | 5/1979 | Japan . |
| 58-10418 | 2/1983 | Japan . |
| 59-00524 | 1/1984 | Japan . |
| 59-123670 | 7/1984 | Japan . |
| 59-138461 | 8/1984 | Japan . |
| 60-71260 | 4/1985 | Japan . |
| 4-197715 | 7/1992 | Japan . |

*Primary Examiner*—Valerie Lund
*Attorney, Agent, or Firm*—Fitzpatrick, Cella, Harper & Scinto

[57] ABSTRACT

An ink jet head comprises parts for holding liquid ink, the parts being sealed with a moisture-curing sealant composed mainly of an organic high polymer compound having an alkoxysilane moiety represented by Formula (1) in the molecule thereof:

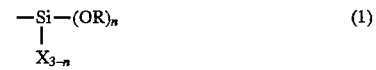

where X is hydrogen, methyl, ethyl, propyl or halogen; R is methyl, ethyl or propyl; and n is 1, 2 or 3.

16 Claims, 4 Drawing Sheets

INK JET HEAD AND INK JET APPARATUS EMPLOYING THE SAME

BACKGROUND OF THE INVENTION

1. Field of the Invention

The present invention relates to an ink jet head, and an ink jet apparatus provided with the ink jet head.

2. Related Background Art

An ink jet systems which conducts printing by forming ink droplets and projecting the droplets onto a recording medium like a paper sheet is advantageous, since the printing can be conducted with extremely low noise at a high printing speed, and color printing can easily be practiced with compactness of the apparatus owing to a smaller size of the printing head. Lately, a bubble jet system is noticed which ejects ink droplets by bubbling of an ink by heating element.

The ink jet head is prepared, for example, by forming a heating element, a driving circuit (e.g., a shift register), a wiring pattern on a silicon substrate by a conventional silicon process; die bonding the silicon substrate on an aluminum base plate onto which a printing substrate for contact with the main body of an apparatus has been preliminarily bonded; connecting the silicon substrate electrically with the printing substrate by wire bonding; bonding the base plate with a ceiling plate having grooves for an ink liquid chamber and an ink flow path formed by injection molding and an ink discharge opening formed by excimer laser with adjustment of the relative position of the ink discharge opening provided on the substrate and the heat-generating element provided on the ceiling plate; fixing the base plate with the ceiling plate by a spring; fixing further a member for supplying ink to the base plate by thermal caulking or a like method; and sealing the bonding interfaces with a sealant.

FIG. 1 illustrates schematically a disassembled ink jet cartridge which comprises an ink jet unit 13 having an ink jet head 12, an ink tank 14 and a cartridge body 1000. The ink jet cartridge is provided with an atmosphere communicating opening 1401 for communication between the inside of the ink jet cartridge and the outside air. A silicon substrate (heater board) 100 having a heating element formed thereon is bonded by die bonding onto a base plate 300 made of aluminum or the like. A print wiring substrate 200 is also bonded onto the base plate 300. The heater board 100 has a preliminarily formed heating element, a shift-register for driving, and a wiring pattern formed by a silicon process. On the wiring substrate 200, contact pads 201 for contact with the main body of the apparatus and wire bonding pads (not shown in the drawing) for contact with the silicon substrate are formed in a conventional wire bonding method.

A ceiling plate 1300 is fixed to the heater board with a spring 500. The ceiling plate 1300 has grooves for serving as an ink flow paths, an ink liquid chamber, and a nozzle (not shown in the drawing) formed thereon by injection molding, and has also an ink discharge opening 8 formed by laser processing. The ceiling plate 1300 is formed integrally with an ink-receiving opening 1500 for receiving ink supplied from the ink tank 14 and directing the ink to the ink liquid chamber, and also with an orifice plate 400 having a plurality of ejection outlets corresponding to the ink flow paths. The ceiling plate 1300 is bonded to the heater board with positional registration between the ink discharge opening and the heating element of the heater board, and fixed tightly by means of a spring 500.

Then an ink-supplying member 600, and an ink tank 14 are fixed onto the supporting member 300 by thermal caulking or the like method. The ink-supplying member 600 has an ink conduit 1600 communicating with an ink-supplying tube 2200 and cantilevered at the ink-supplying tube side. A sealing pin 602 is inserted at the fixed side of the ink conduit 1600 and the ink-supplying tube 2200. A filter 700 is disposed at the ink tank side end of the ink-supplying tube 2200. An inksupplying opening 1200 functions to supply ink from the ink tank 14 to the ink jet unit 13.

The gaps between these members are sealed with a sealant to prevent leakage of ink. The sealant is required to fill completely the gaps to be sealed but not to penetrate into fine structure portions such as the nozzle, and to be easily handleable. From such reasons, moisture-curing one-pack type silicone sealant is conventionally used for the sealing. This is because the silicone sealant has high ink resistance, high adhesiveness, moisture-curability, and possibility of giving desired viscosity and tack-free time.

One important problem involved in the ink jet head is prevention of formation of an air bubble. If an air bubble is formed in the ink flow path or the ink liquid chamber in the ink jet head, the energy for ejection is absorbed by the air bubble, making ink ejection instable or interrupting ink supply. The removal of the air bubble is conventionally practiced by sucking the ink by means of a recovery pump equipped in the ink jet apparatus. However, after the removal of the air bubble, the air bubble will again be formed gradually in the ink during standing of the head to result in the aforementioned inconvenience. Therefore, the recovery operation for the ink head needs to be practiced frequently. In recent years, the ink jet apparatus is required to be miniaturized, and therefore the ink-storing capacity of the ink tank tends to be made smaller and the ink absorption capacity of the waste ink absorbent also tends to be made smaller. Thus, it is an important technical problem to abate the recovery pump operation to the utmost for miniaturization of the ink jet apparatus.

After comprehensive investigation on the aforementioned air bubble formation, it was found by the inventors of the present invention that the principal cause of the bubble formation is penetration of gas through the silicone sealant, although other causes are involved such as looseness between the constituting members, the material of the constituting members, degree of air bubble removal depending on suction conditions with recovery pump.

The organosilicone compound conventionally used as the moisture-curing silicone sealant is assumed to have high gas permeability and allows formation of air bubble in the ink flow path, probably because the compound has large bond distance between the silicon and the carbon atom or other atom.

The inventors noticed the importance of the sealant, and investigated the sealant to replace the conventional moisture-curing one-pack type silicone sealant.

To solve the aforementioned problem of gas penetration, use of an organic high polymer was considered which has a high gas barrier property. General-purpose organic high polymers have lower gas permeability than the silicone type high polymers by a factor of 100. However, the organic high polymers themselves are not useful for the sealing material. Few organic high polymers are moisture-curable, or are not satisfactory in resistance to ink, adhesiveness to constituting members, and so forth.

Use of a moisture-curing one-pack type sealant is indispensable for sealing the gaps between the members of the ink jet head, which is brought into contact with ink, for stable and simple production of the heads. Since the ink jet head is constituted by various molded resin parts, the head cannot readily be sealed by pouring a thermoplastic resin or using a thermosetting resin. On the other hand, use of a two-pack type curing resin for the sealing of the head is not suitable for industrial production since the two curing components need to be mixed immediately before the use and have to be used within a prescribed time. The moisture-curing type resin penetrates into the gaps between the head-constructing parts by a capillary phenomenon and stops the penetration by forming meniscus at the portion other than the gap, and finally cures. Therefore, the sealant penetrates stably into the gaps to be sealed, but does not enter the portion where the penetration of the sealant is not desired, advantageously.

Such desirable properties cannot be achieved with two-pack type sealing materials, photosensitive sealing materials, or thermosetting type sealing materials.

On the other hand, cyanoacrylate and moisture-curing type urethane sealing materials are not suitable since such materials are insufficient in ink-resistance because of the hydrolyzable acrylic bonding or urethane bonding in the molecule.

SUMMARY OF THE INVENTION

The present invention provides an ink jet head sealant which has high gas-barrier properties and is moisture-curable for preventing penetration of gas into an ink flow path to stabilize ink ejection and abating recovery-pump operation.

The present invention provides an ink jet head, which suppresses formation of air bubble in the head, enables stable printing with less ejection-recovery operation, and can be produced as stably and simply as conventional heads. This ink jet head is produced by using a general-purpose organic high polymer having high gas barrier properties for the ink jet sealant, and conducting silicone-modification to give moisture-curing properties at the end of the organic high polymer molecule.

The present invention also provides an ink jet apparatus employing the above ink jet head.

The ink jet head of the present invention comprises parts for holding liquid ink, the parts being sealed with a moisture-curing sealant composed mainly of an organic high polymer having an alkoxysilane moiety represented by Formula (1) in the molecule thereof:

  (1)

where X is hydrogen, methyl, ethyl, propyl or halogen; R is methyl, ethyl or propyl; and n is 1, 2 or 3.

The ink jet apparatus of the present invention comprises an ink jet head for ejecting ink, an ink tank for supplying ink to the ink jet head, and an ink ejection recovery device for recovery the ink ejection of the ink jet head, wherein parts for holding liquid ink are sealed with a moisture-curing sealant composed mainly of an organic high polymer having an alkoxysilane moiety represented by the above Formula (1) in the molecule thereof.

DETAILED DESCRIPTION OF THE PREFERRED EMBODIMENTS

Figure 1:
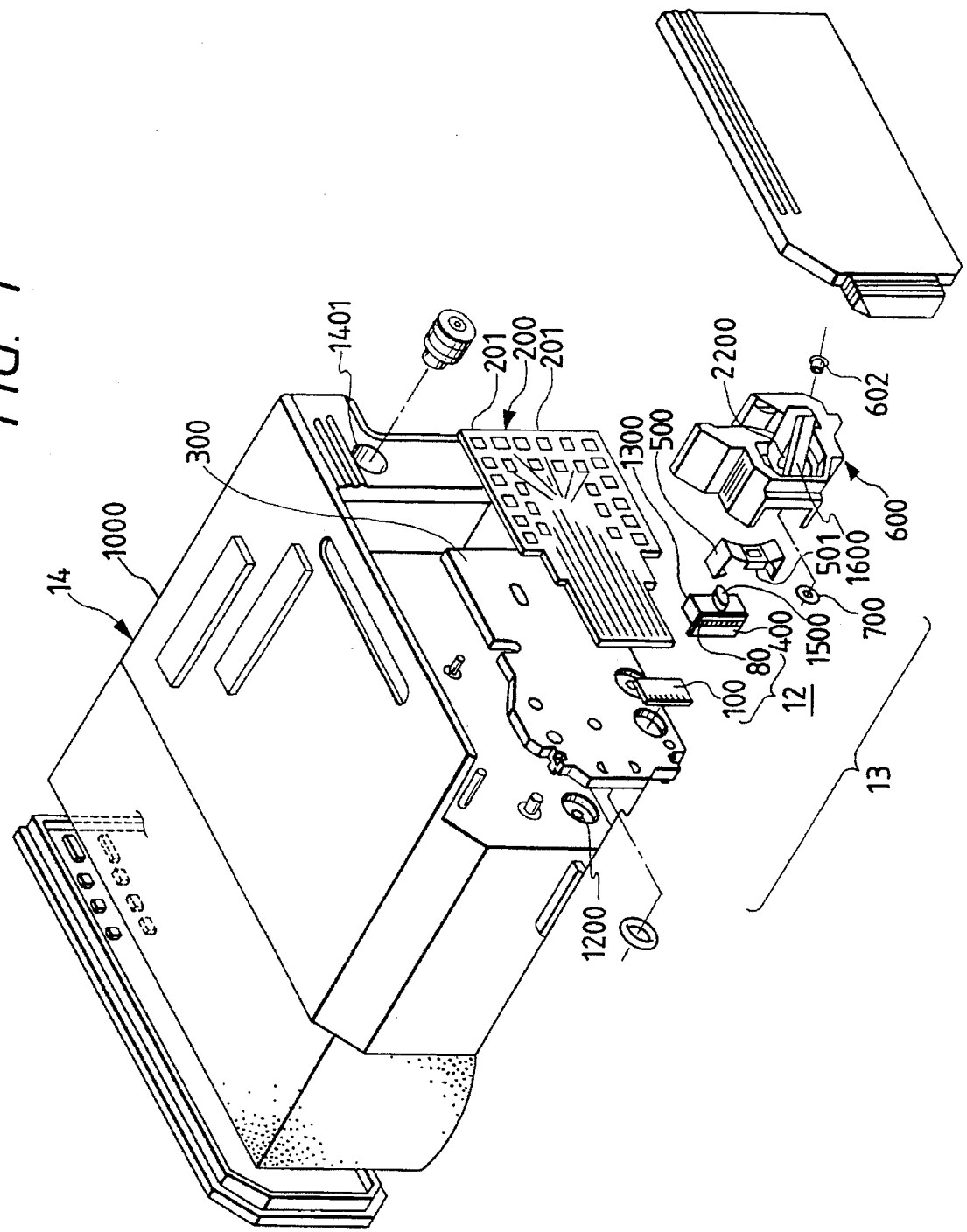
FIG. 1 is a schematic exploded view of an ink jet cartridge constituted integrally by an ink jet unit having an ink jet head and an ink tank.

The ink jet head of the present invention employs a sealant comprising a modified general-purpose organic high polymer having high barrier properties. The organic high polymer is modified to have a silicone structure at the end of the molecule to be moisture-curable. Specifically, the terminal structure of the molecule in the present invention is shown by Formula (1) below:

  (1)

where each X is independently hydrogen, methyl, ethyl, propyl or halogen; R is methyl, ethyl or propyl; and n is 1, 2 or 3.

The end of the organic high polymer molecule in the present invention is silicone-modified to impart moisture-curable properties to the organic high polymer. Generally, conventional moisture-curable one-pack type liquid sealants are composed of a substance having at the end of the molecule an alkoxy group-containing silane moiety which is readily hydrolyzable. The alkoxy group is hydrolyzed by moisture to form an instable silanol group. The resulting silanol is extremely instable and polymerizes in the presence of a small amount of catalyst such as an organic tin compound to form a gel. A general-purpose organic high polymer can be made moisture curable, if it is modified to have an alkoxy silicone moiety in the molecule.

The most simplest silicone-modification is addition of a silane coupling agent. The silane coupling agent has in the molecule an alkoxy group and a reactive group capable of reacting an organic high polymer compound, the reactive group including vinyl, epoxy, amino, methacryl, acryl, and mercapto. Thereby, the organic high polymer compound can be readily modified to be moisture-curable by the silane coupling agent.

The silane coupling agent may be any compound represented by the structural formula, R—Si≡(X)$_3$, or R—Si≡(R')(X)$_2$, where R is an organic moiety having a group of vinyl, epoxy, amino, imino, or mercapto; R' is a lower alkyl group; and X is methoxy, ethoxy, or chlorine. Specifically the silane coupling agent includes vinyl silanes such as vinyltrichlorosilane, vinyltrimethoxysilane, and vinyl-tris(2-methoxyethoxy)-silane; methacrylsilanes such as 3-methacryloxypropyltrimethoxysilane; epoxysilanes such as 3-glycidoxypropyltrimethoxysilane, and 2-(3,4-epoxycyclohexyl)ethyltrimethoxysilane;aminosilanes such as 3-aminopropyltriethoxysilane, N-2-(aminoethyl)-3-aminopropyltrimethoxysilane, N-2-(aminoethyl)-3-aminopropylmethyldimethoxysilane, and N-phenyl-3-aminopropyltrimethoxysialne; and mercaptosilanes such as 3-mercaptpropyltrimethoxysilane; and the like. The silane coupling agent is added preferably in an amount of about 0.1% to about 5% by weight of the entire sealant composition.

In order to obtain a sealant which exhibits a stable viscosity and a stable tack-free time, the alkoxy silane group needs to be introduced to organic high polymer under conditions which does not cause decomposition of the alkoxy group. The alkoxy group bonded to a silicon atom is so instable that it is hydrolyzed readily in the presence of a small amount of moisture. Therefore, the method of introduction of the alkoxy silane into the organic high polymer is limited in the reaction conditions and the molecular structure thereof.

Another suitable method for silicone-modification is introduction of a polyvalent isocyanate and subsequent introduction of an alkoxysilane group as described in JP-B-46-30711. The isocyanate group is highly reactive to active hydrogen of a hydroxyl group or an amino group to form urethane linkage or a urea linkage. This property is useful for introducing an alkoxy silane group to an organic high polymer. The moiety thus formed has structure shown by Formula (2) or (3) below:

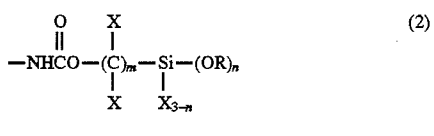

or

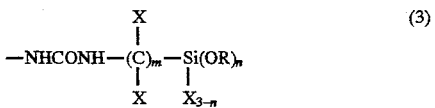

where m is an integer of from 0 to 5, and other symbols mean the same as in Formula (I).

Any high polymer compound is useful therefor which has a hydroxyl group or an amino group in the molecule. Of the polymers, polyols are used suitably which are conventionally used as a starting material for polyurethane resins.

The polyol used for the silicone-modified urethane resin employed in the present invention has about 2 to 6 functional groups, preferably about 2 to 4; the molecular weight of from about 200 to about 200,000, preferably from about 300 to 100,000, more preferably from about 300 to 50,000; the acid value of from about zero to 280, preferably from about zero to 100, more preferably from zero to 50 mg KOH/g. Specifically the polyol includes polyester polyols, polyether polyols, polyetherester polyols, polyesteramide polyols, acryl polyols, polyhydroxyalkanes, caster oil, and polyurethane polyols, and mixtures thereof.

The polyester polyol includes reaction products of a dibasic acid with a glycol; polycaprolactone, polyvalerolactone, poly(β-methyl-γ-valorolactone), and the like. The above dibasic acid includes terephthalic acid, isophthalic acid, adipic acid, azelaic acid, sebacic acid, maleic acid, succinic acid, glutaric acid, pimelic acid, suberic acid, and the like and mixtures thereof. The above glycol includes ethylene glycol, diethylene glycol, propylene glycol, dipropylene glycol, butylene glycol, neopentyl glycol, 1,6-hexane glycol, 3-methyl-1,5-pentanediol, 3,3'-dimethylolheptane, polyoxyethylene glycols, polyoxypropylene glycols, polytetramethylene ether glycols, and the like, and mixtures thereof.

The polyether polyol includes those obtained by polymerizing an oxirane compound such as ethylene oxide, propylene oxide, butylene oxide, and tetrahydrofuran by use, as the initiator, of water or a low molecular weight polyol such as ethylene glycol, propylene glycol, trimethylolethane, trimethylol propane, and glycerin.

The polyesteramide polyol includes those obtained by using an amino group-containing compound such as ethylenediamine, propylenediamine, and hexamethylenediamine additionally in the aforementioned polyester formation reaction.

The acryl polyol includes those obtained by copolymerizing a polymerizable monomer having one or more hydroxyl groups such as hydroxyethyl acrylate, hydroxypropyl acrylate, hydroxybutyl acrylate, or corresponding methacrylate with acrylic acid, methacrylic acid or the like or their esters.

The polyhydroxyalkane includes a liquid rubber obtained by polymerizing butadiene or copolymerizing butadiene with acrylamide, or the like.

The polyurethane polyol is a polyol having an urethane linkage in the molecule, and is obtained by reacting a polyether polyol, polyester polyol, or polyetherester polyol having a molecular weight of about 200 to 5000 with the aforementioned organic polyisocyanate at an NCO/OH ratio of lower than about 1, preferably lower than about 0.8.

In addition to the aforementioned polyol, a low molecular weight polyol having a molecular weight of from 62 to 200 may be used mixedly for the purpose of adjusting the average molecular weight of the polyol component. The low molecular weight polyol includes glycols used for producing polyester polyol such as ethylene glycol, propylene glycol, butylene glycol, diethylene glycol, dipropylene glycol, hexylene glycol, neopentyl glycol, and cyclohexanedimethanol, and polyols such as glycerin, trimethylolpropane, and pentaerythritol.

As the polyvalent isocyanate, ordinary isocyanates employed as a starting material for a polyurethane is suitably used.

The organic polyisocyanate as the polyvalent isocyanate used in the present invention includes aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethyl caproate; alicyclic diisocyanate such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4-methylene-bis(cyclohexyl isocyanate), methyl-2,4-cyclohexane diisocyanate, and 1,3-bis(isocyanatomethyl)-cyclohexane; aromatic diisocyanates such as m-phenylene diisocyanate, p-phenylene diisocyanate, 4,4'-diphenylmethane diisocyanate, 1,5-naphthalene diisocyanate, 2,4- or 2,6-tolylene diisocyanate or mixtures thereof, 4,4'-toluidine diisocyanate, dianisidine diisocyanate, and 4,4'-diphenyl ether diisocyanate; aromatic-aliphatic diisocyanate such as 1,3- or 1,4-xylylene diisocyanate and mixtures thereof, ω,ω'-diisocyanato-1,4-diethylbenzene, and 1,3- or 1,4-bis (1-cyanato-1-methylethyl)benzene and mixtures thereof; organic triisocyanates such as triphenylmethane-4,4', 4"-triisocyanate, 1,3,5-triisocyanatobenzene, and 2,4,6-triisocyanatotoluene; organic tetraisocyanate such as 4,4'-diphenyldimethylmethane-2,2',5,5'-tetraisocyanate; dimers, trimers, biurets, and allophanates derived from the above polyisocyanate monomer; polyisocyanates having a 2,4,6-oxadiazinetrione ring derived by reaction of carbon dioxide with the above polyisocyanate monomer; adducts with low molecular weight polyol having a molecular weight of lower than 200 such as ethylene glycol, propylene glycol, butylene glycol, hexylene glycol, neopentyl glycol, 1,6-hexane glycol, 3-methyl-1,5-pentanediol, 3,3'-dimethylolheptane, cyclohexanedimethanol, diethylene glycol, triethylene glycol, dipropylene glycol, glycerol, trimethylolpropane, pentaerythritol, and sorbitol; adducts with a polyester polyol, polyether polyol, polyetherester polyol, polyesteramide polyol, polycaprolactone polyol, polyvalerolactone polyol, and acrylpolyol-polyhydroxyalkane, having a molecular weight of about 200 to 200000, and caster oil.

The silane compound to be used for the silicone-modification is not limited, provided that it has an alkoxy group and a group capable of reacting with the isocyanate group such as silyl, silanol, amino, and hydroxyl. The alkoxy group may be methoxy, ethoxy, or propoxy. Of these, the methoxy group is preferred because of ease of hydrolysis and cost thereof. One to three alkoxy groups may exist in the silane molecule. Those having two to three alkoxy groups realize stable tack free time and stable curing properties.

The silane compound includes specifically dimethoxymethylsilane, trimethoxysilane, dimethylethoxysilane, diethoxysilane, diethoxymethylsilane, triethoxysilane, 3-aminopropyltrimethoxysilane, and 2-aminoethylaminomethyltrimethoxysilane.

Many silane compound are synthesized in recent years, and will be commercialized in the future. The present invention is characterized by an ink jet head which employs silicone-modified resin modified by utilizing the reaction of a isocyanate group with a silyl group (H—Si), a silanol group, an amino group, or a hydroxyl group. The moiety between the amino or hydroxyl group and the alkoxysilane may be in any chemical structure.

The sealing material can be synthesized simply, for example, by reacting an excess amount of a diisocyanate with a high polymer compound having a terminal hydroxyl group to introduce an isocyanate group to the terminal of the polymer molecule, and subsequently reacting the aforementioned alkoxysilane with the terminal isocyanate group of the polymer. No water is formed in the reactions, and water as impurity can be removed by reaction of the isocyanate with water in the reaction system. Therefore, the resulting sealant has high storage stability.

Still another method of modifying an organic polymer compound with an alkoxysilane is reaction of allyloxy group of organic polymer compound with a mercapto group-containing alkoxysilane or with alkenyloxy group-containing alkoxysilane, which is disclosed in JP-B-58-10418, and JP-B-59-524. The modified polymer has a terminal structure of ether linkage between the high polymer compound and the alkoxysilane as shown by Formula (4) below:

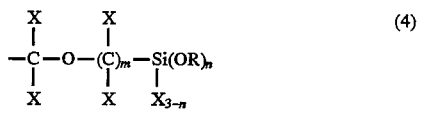
(4)

where m is an integer of from 0 to 5, and other symbols mean the same as in Formula (1).

In this method, a high polymer compound having a terminal hydroxyl group is firstly reacted with allyl chloride to form a terminal unsaturated bond by a vinyl ether linkage, and then an alkoxysilane, mercaptoalkoxysilane, or alkenyloxy-containing silane is added to the unsaturated bond by use of a catalyst, e.g., platinum by a conventional double bond addition reaction. The alkoxy-containing silane used in this reaction includes those mentioned above. The mercapto group-containing silane is exemplified by dimethoxy-3-mercaptosilane, and 3-mercaptopropyltrimethoxysilane. The double bond-containing alkoxysilane is exemplified by methoxydimethylvinylsilane, trimethoxyvinylsilane, and diethoxymethylvinylsilane.

On the other hand, the organic high polymer compound as the main chain has a terminal hydroxyl group which enables the aforementioned silicone-modification. A polyether polyol is most suitably used. The polyether polyol has relatively high ink resistance and a low viscosity suitable for the sealant for an ink jet head. However water absorption properties of the relatively high hydrophilic polyether polyol needs to be considered in use as a sealant for the ink jet head. If the sealant has high water absorption properties, water absorbed by the sealant weakens the adhesion between the sealant and the construction member of the ink jet head, which may cause leakage of the ink. The water absorption tendency of the polyether polyol is less at a higher carbon/oxygen ratio of the polyether molecule. Therefore, polyether propanol, and polyether butanol exhibit less water absorption properties than polyether glycol. The polyether polyol as the raw material should be suitably selected by considering the viscosity as well as the water absorption properties.

Sufficiently low water absorption can be achieved by use of polybutadienediol or polycarbonatediol, thereby water absorption being prevented almost completely.

The silicone-modified urethane sealant employed in the present invention is prepared by blending a curing catalyst into the silicone-modified urethane resin. For further improvement of the sealing properties, a coupling agent such as a silane-coupling agent and a titan-coupling agent may be added, if desired.

Other additives such as an antioxidant, a UV-absorbing agent, a hydrolysis-inhibitor, a mildew-proofing agent, a thickening agent, plasticizer, pigment, filler and so forth may be added as desired. Further, for controlling the curing reaction, a known catalyst or a known additive may be added.

When the silicone-modified urethane resin is used as the sealant prepared as above, a silanol condensation catalyst is not indispensable. However, when the terminal hydrolyzable group is alkoxy, the condensation catalyst is preferably used since the curing reaction proceed slowly with the silicone-modified urethane resin without the catalyst. The effective condensation catalyst includes alkyl titanate salts; organo-silicotitanate salts; metal salts of carboxylic acid such as tin octanoate, dibutyltin dilaureate, dibutyltin maleate, dibutyltin phthalate, and lead octanoate; salts of amines such as triethylamine salts, triethylenediamine salts, and an amine salt of dibutylamine-2-ethyl hexanoate; and other acidic catalyst and basic catalyst to known as silanol-condensation catalyst. These catalysts may be used singly or in combination of two or more thereof.

In the ink jet head and the ink jet apparatus, the sealant is required to be applied to extremely fine portion. Therefore the viscosity of the sealant is highly important in view of operability. The sealant for the ink jet head and the ink jet apparatus has a viscosity ranging preferably from 2000 to 50000 cp.

The ink jet head, and the ink jet apparatus equipped with the ink jet head are described below in more detail by reference to examples.

Firstly, an ink jet apparatus equipped with an ink jet head of Examples is explained by reference to FIG. 3.

Figure 3:
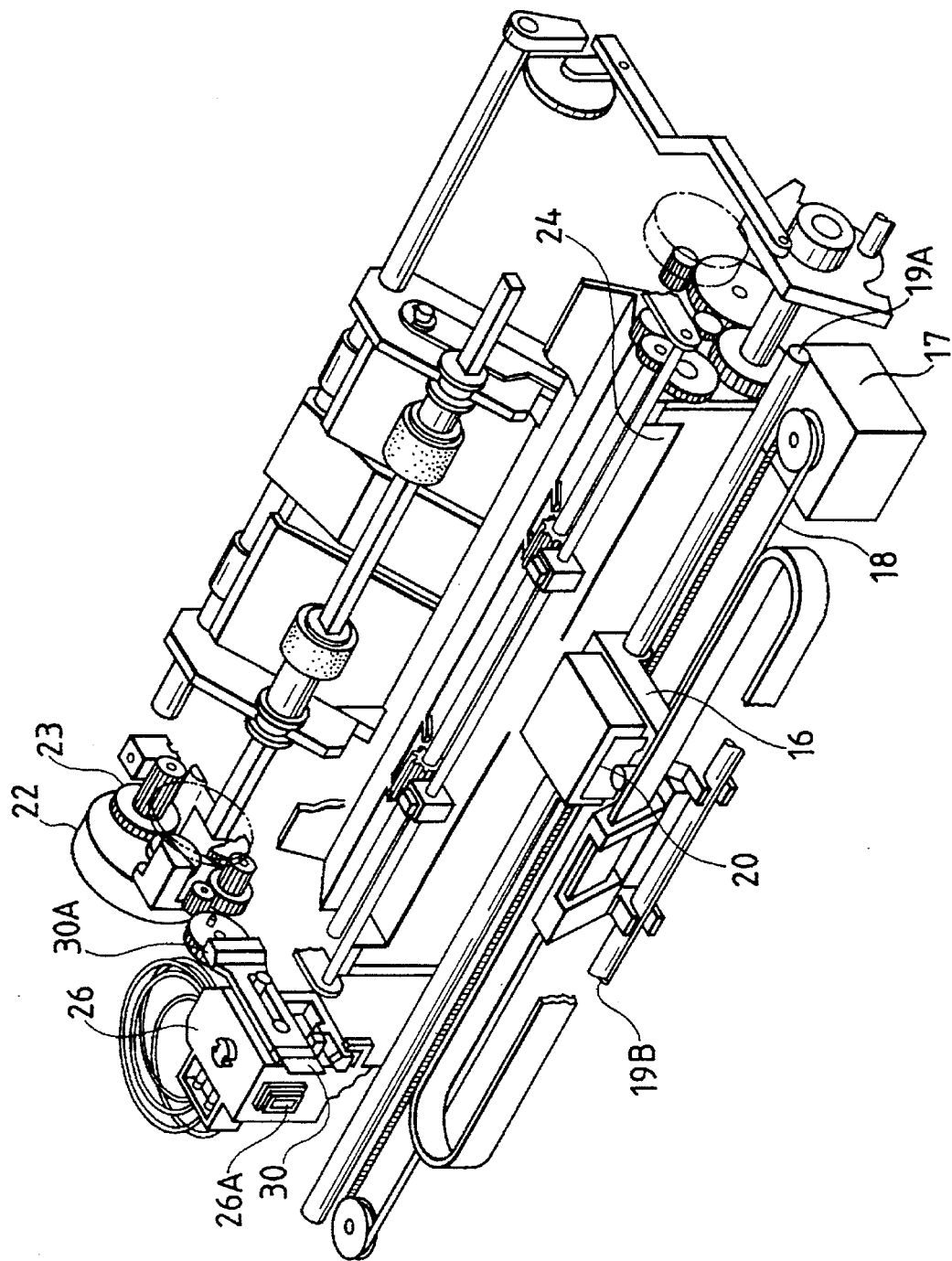
FIG. 3 is a perspective view an ink jet recording apparatus employing an ink jet head cartridge with an ink jet head of the present invention.

FIG. 3 is a perspective view of an Example of an ink jet apparatus (IJA) equipped with an ink jet head cartridge (IJC) with an ink jet head of the present invention.

In FIG. 3, the ink jet cartridge (IJC) 20 has nozzles for ejecting ink against a printing surface of a printing paper sheet fed onto a platen 24 as the recording medium. A carriage (HC) 16 holding the IJC 20 is connected to a portion of a driving belt 18 which transmit the driving force of a driving motor 17, whereby the IJC 20 is capable of moving slidably on two guide shafts 19A and 19B over the entire width of the printing paper.

A head-recovery device 26 is provided at an end of the moving range of the IJC 20, for instance, at a position opposing to the home position. The IJC 20 is capped by driving force of a motor 22 through transmission mechanism 23. The IJC is also capped after completion of printing for protection.

A blade 30 made of silicone rubber is provided as a wiping member at the side of the head-recovery device 26. The blade 30 is held by a blade-holding member 30A in a cantilever state, and can be brought into contact with the ejection face of the IJC 20 by action of the motor 22 and the transmission mechanism 23. Thereby the blade 30 is allowed to protrude to the moving path of the IJC 20 with appropriate timing during printing operation of the IJC 20 or after ejection-recovery operation with the head-recovery device 26. As the IJC 20 moves, the protruded blade wipes the ejection face of the IJC 20 to remove dew, residuum, or dust from the ejection face.

In Examples below, the quantity "parts" is based on weight.

EXAMPLE 1

To 100 parts of polypropylene glycol (average molecular weight: 1000, hydroxy equivalent: 111 mgKOH/mg), 60 parts of tetramethylene diisocyanate was added, and the mixture was refluxed at 180° C. for 4 hours to cause reaction of the hydroxyl group of the polypropylene glycol with the isocyanate. By this reaction, the isocyanate was bonded to the both ends of the polypropylene glycol molecule. The excess isocyanate served to remove moisture in the system by reaction of the isocyanate group with water. Then 150 parts of γ-aminopropyltrimethoxysilane was added thereto, and the mixture was allowed to react at 100° C. for 2 hours. Thereby the polymer was silicone-modified by formation of urea linkage by reaction of the terminal isocyanate group of the polymer with the amino group of the alkoxysilane. Thereto dibutyltin dilaurate and triethylamine were added as the curing catalyst in an amount of 0.8% by weight of the resin respectively to prepare a sealant. The resin had a viscosity of 13000 cps and a tack-free time of 30 minutes. This sealant was employed in assemblage of an ink jet head, and the sealing properties were evaluated.

Figure 2:
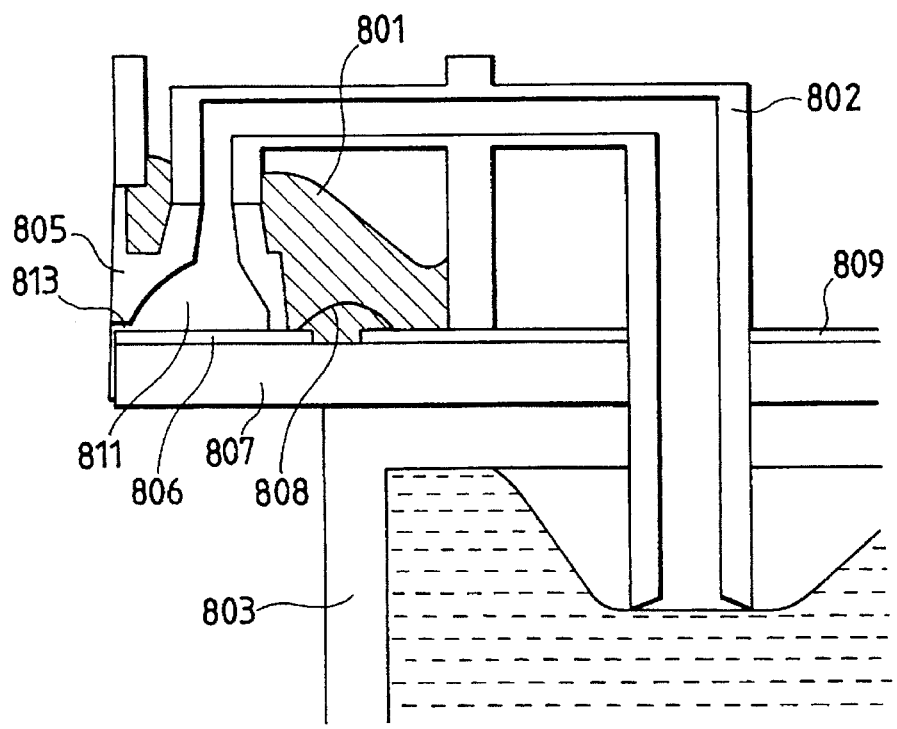
FIG. 2 is a sectional view of an ink jet head portion of an ink jet cartridge taken along an ink flow path.

An ink jet head was assembled as shown in the sectional view of FIG. 2. A substrate 806 having a heater and a driver formed by a conventional silicon process (for dot pitch: 360 DPI, 48 nozzles) was bonded to an aluminum base plate 807 having a printed substrate 809 stuck thereon by die-bonding wherein substrate 806 and printed substrate 809 are electrically connected by a wire 808 by wire-bonding. Separately a ceiling plate 805 made of polysulfone having an ink flow path an liquid chamber 811 and nozzle 813 was formed integrally by injection molding, and thereon discharge opening was formed by excimer laser. This ceiling plate 805 was fixed onto the substrate 806 by a fixation spring (not shown in the drawing) such that the discharge opening came to the most suitable position relative to the heater. An ink-supplying member 802 was fixed to the base plate 807 by thermal caulking.

Figure 4:
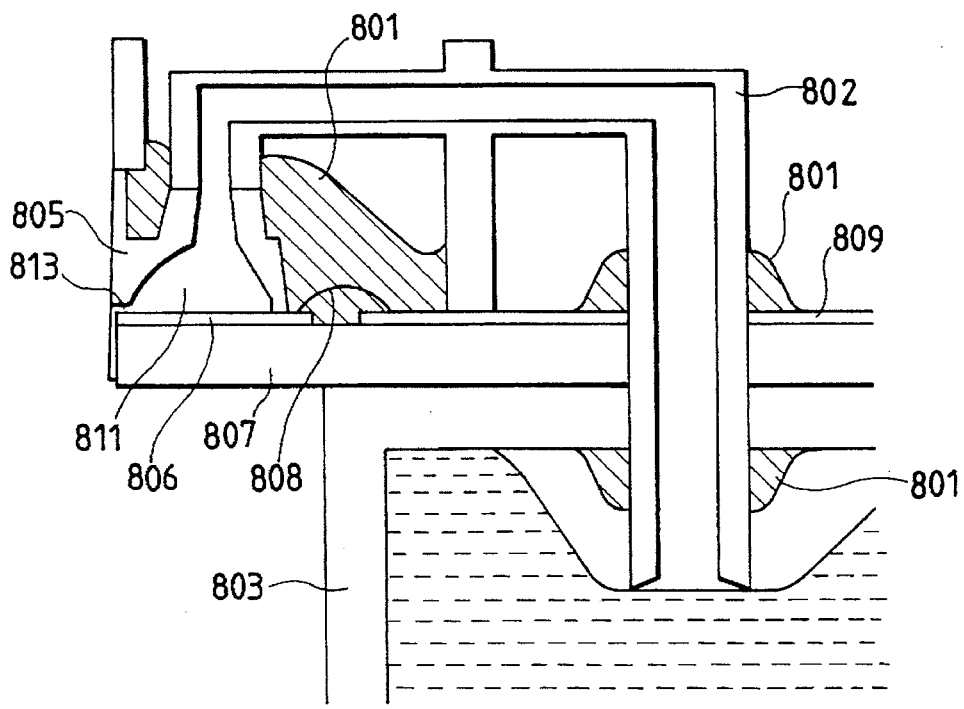
FIG. 4 is a sectional view of an ink jet head portion for explaining a sealing portion according to the present invention.

The aforementioned sealant was poured by a dispenser into the above prepared ink jet head which was held at a tilting angle of 30° by a jig kept at 40° C. The sealing state is shown in FIG. 4. The sealant 801 filled the bonding interfaces between the ceiling plate 805 and the ink-supplying member 802, and between the ceiling plate 805 and the heater substrate 806, and cured. The sealant did not flow into the nozzle 813 formed on the ceiling plate nor into the liquid chamber 811. Then, an ink tank 803 was fixed to the base plate 807 by thermal caulking, and thereto ink was filled to complete an ink jet head.

EXAMPLE 2

A silicone-modified resin was synthesized by reacting polypropylene glycol with tetramethylene diisocyanate in the same manner as in Example 1, adding thereto 100 parts of trimethoxysilane, and stirring at 80° C. for 2 hours. Thereto 1% by weight of dibutyltin dilaurate and 1% by weight of triethylamine based on the resin were added to prepare a sealant. The resulting sealant was employed in preparation of an ink jet head in the same manner as in Example 1.

EXAMPLE 3

A polymer compound having a terminal allyloxy group was synthesized by reaction of polypropylene glycol (average molecular weight: 1000) with allyl chloride in a conventional manner. The resulting polymer compound was reacted with dimethoxymethylsilane by use of a platinum catalyst. The resin had a structure similar to Kaneka MS Polymer commercially produced by Kanegafuchi Chemical Industry Co., Ltd. To the resin, the tin catalyst and the amine catalyst were added in the same manner as in Example 1 to prepare a moisture-curing sealant. This sealant was employed for preparing an ink jet head in the same manner as in Example 1.

EXAMPLE 4

Polypropylene glycol having an allyloxy terminal group was synthesized in the same manner as in Example 3. This allyloxy-terminated polypropylene glycol was reacted with dimethoxy-3-mercaptosilane to form an adduct, thereby silicone-modified polypropylene glycol being synthesized as a sealing material. This material was employed for preparation of an ink jet head in the same manner as in Example 1.

EXAMPLE 5

500 Parts of polybutadienediol (average molecular weight: 2800, hydroxyl equivalent: 42.1 mgKOH/g, manufactured by General Science Corporation) was reacted with 130 parts of hexamethylene diisocyanate in the same manner as in Example 1, and then the product was reacted with 150 parts of γ-aminopropyltrimethoxysilane in the same manner as in Example 1. Thereto, dibutyltin dilaurate and triethylamine were added in an amount of 1% by weight respectively based on the obtained polymer to prepare a sealant. This sealant was employed in preparation of an ink jet head in the same manner as in Example 1.

COMPARATIVE EXAMPLE

An ink jet head was prepared in the same manner as in Example 1 except that a silicone resin was used as the sealant.

Twenty ink jet heads were prepared in each of Examples and Comparative Example. The ink jet heads were respectively mounted on a ink jet apparatus having construction as shown in FIG. 3, and were tested for gas barrier properties by the test method described below.

The ink jet head was subjected to ejection recovery by suction through a cap 26A with a suction pump 26 placed at the home position of the ink jet apparatus. After the recovery by suction, the performance of printing was confirmed. Then the ink jet head kept on the carriage was left standing at 35°

C. and relative humidity of 10%. Full printing on one A4-size paper sheet was conducted every 24 hours repeatedly without ejection recovery. The printing test was repeated until ejection failure was caused by air bubble formation. The driving frequency for printing was 4.0 kHz.

The ink jet head which did not cause ejection failure for 30 days or more was evaluated as "excellent". The one which did not cause ejection failure after 5 days but caused the failure before the 30th day was evaluated as "fair". The one which caused ejection failure within 5 days was evaluated as "poor". The results are shown in Table 1.

TABLE 1

| Example 1 | Excellent |
|---|---|
| Example 2 | Excellent |
| Example 3 | Excellent |
| Example 4 | Excellent |
| Example 5 | Excellent |
| Comparative example | Poor |

Table 1 shows that the ink jet head of the present invention is capable of conducting stable ink ejection for a long term without trouble of air bubble formation, being different from conventional ink jet head.

Further, the sealants prepared in Examples 1 to 4 were tested for ink resistance to Canon BJ cartridge BC-01 ink by use of a pressure cooker. As the results, any of the sealants did not give eluting matter nor deterioration, and the ink resistance was satisfactory.

Examples above show the use of the sealant only for construction of ink jet portion. The present invention is not limited thereto. By using additionally the sealant of the present invention for the joint portion between the ink-supplying member 802 and the ink tank 803 as shown in FIG. 4, the reliability of the apparatus is further improved.

Figure 5A:
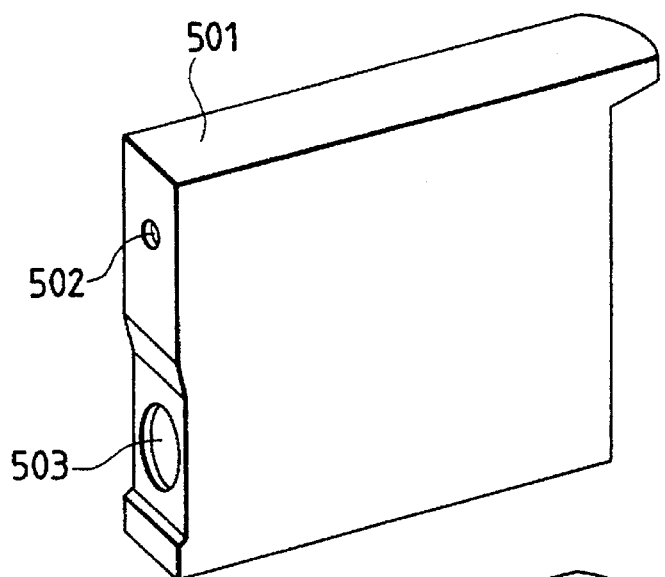
FIGS. 5A to 5C illustrate applications of the sealant of the present invention to an ink cartridge.
Figure 5B:
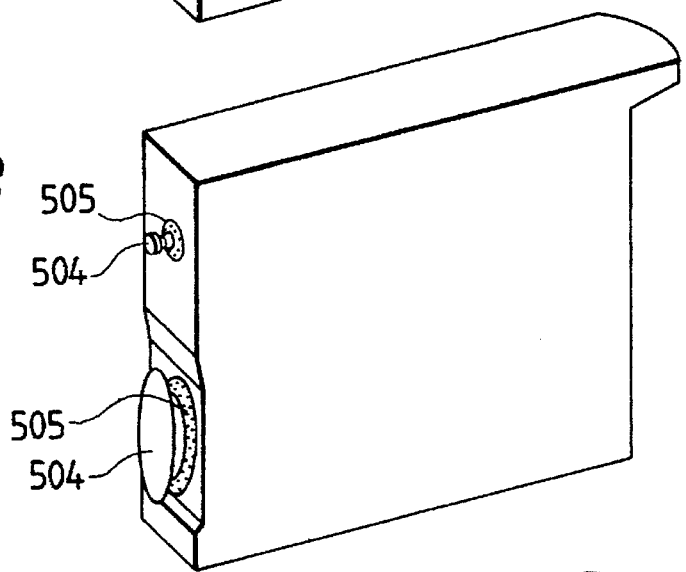
Figure 5C:
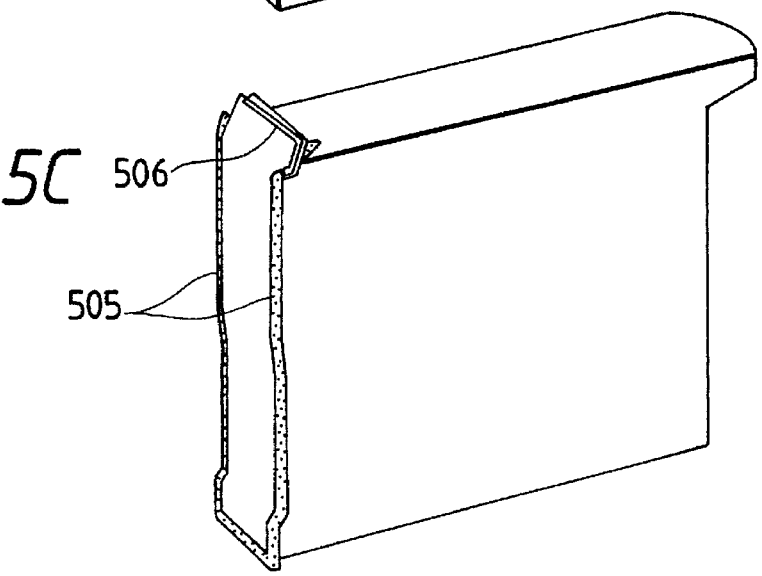

Furthermore, the sealant of the present invention is useful not only for ink jet head but also useful for joint portion between the ink tank and the ink tank cover, and the joint portion between the waste-ink tank and the suction pump. Application to an ink cartridge is explained below. FIG. 5A illustrates a tank-exchange type of ink tank 501, having an air communication hole 502 and an ink-supplying hole 503. FIG. 5B illustrates capping with caps 504 and sealing, with a sealant 505 of the ink-supplying hole 503 and the air communication hole 502, when the ink tank which still contains ink is demounted from a head unit. FIG. 5C illustrates the demounted ink tank having the ink-supplying hole portion and the air communication hole portion sealed with a sealing tape 506 and application of a sealant 505 at the peripheral portion. In such a way as shown in FIG. 5B and FIG. 5C, the tank-exchange type ink tank still containing ink can be stored with less evaporation of ink without an ink tank-storage box usually used for prevention of ink evaporation, viscosity rise, and sticking.

The present invention also covers the constitution of coating, with the sealant of the present invention, of a portion made of low gas-barrier material such as ink supplying tube. This coating may be conducted either on an internal surface or an external surface. Further, the sealant itself of the present invention may be used not only for sealing but also for constitution of the ink jet head or the ink-supplying member of an ink jet apparatus.

The ink jet head of the present invention is particularly effective in use for an ink jet head and an ink jet apparatus for conducting printing by ejecting ink droplets by utilizing thermal energy.

The typical constitution and the principle of the ink jet system are disclosed, for example, in U.S. Pat. No. 4,723,129, and U.S. Pat. No. 4,740,796. The present invention is applicable preferably to such systems, including both of an on-demand type and of a continuous type.

The ink jet system is explained briefly. A driving signal is applied to an electrothermal transducer placed on a sheet or a liquid flow path holding a liquid (ink) to cause rapid temperature rise in the liquid exceeding nuclear boiling temperature or to film boiling temperature in accordance with information to be printed, whereby thermal energy is generated to cause film boiling of the liquid (ink) at the heat-generating surface. In such a manner, bubbles are formed in the liquid (ink) in one-to-one correspondence with the driving signal imparted to the electrothermal transducer. Therefore the ink jet system is particularly effective for on-demand type printing. The liquid (ink) is discharged by growth or constriction of the bubble through the discharge opening to form at least one droplet. Preferably with pulse-shaped driving signals, the growth and constriction of the bubbles occurs instantaneously and appropriately to eject the liquid (ink) with especially excellent responsiveness. The pulse-shaped driving signal is suitable which is described in U.S. Pat. No. 4,463,359 and U.S. Pat. No. 4,345,262. The printing can be conducted further more satisfactorily under the conditions described in U.S. Pat. No. 4,313,124 which relates to an invention of temperature-rise rate at the aforementioned heat-generating surface.

The present invention is naturally applicable also to the system employing electromechanical transducer as the ejection energy generator.

The construction of the ink jet head includes a combination of discharge opening, a liquid flow path, and an electrothermal transducer (linear liquid flow path or rectangular liquid flow path) disclosed in the above-cited patent specifications, and also a constitution having the thermal action portion disposed in a folded region as shown in U.S. Pat. No. 4,558,333, and U.S. Pat. No. 4,459,600.

The present invention is also effective for the construction in which a common slit is provided as ink discharge opening for a plurality of electrothermal transducer as disclosed in JP-A-59-123670, and the construction in which openings for absorption of thermal energy pressure waves are counterposed to the discharge opening portions as disclosed in JP-A-59-138461.

The present invention is also effectively utilized for a full-line type ink jet head which extends over the maximum width of the recordable range of the recording medium of the recording apparatus. This full-line head may be a combination of a plurality of recording heads as disclosed in the aforementioned patent specification, or may be one full-line ink jet heads integrated into one body.

Further, the present invention is effective to an exchangeable chip type ink jet head which can be electrically connected to the main body of the apparatus and can receive ink supply therefrom; and to an ink jet cartridge having a built-in ink jet head.

The ink jet apparatus preferably includes an auxiliary device for stabilization of printing. The additional auxiliary device is exemplified by an electrothermal transducer or a separate heating element, a preliminary heating means, and a preliminary ink ejection mode-providing means.

The print mode for the ink jet apparatus of the present invention is not limited to a single color printing such as black printing. The ink jet head may be integration of, or combination of a plurality of different color printing heads.

The above description is made by employing a liquid ink. The ink in the present invention, however, is not limited thereto, and may be solid or greasy at room temperature. The ink jet apparatus controls the temperature of ink generally in the range of from 30° C. to 70° C. to keep the viscosity of the ink to be suitable for stable ink ejection. Therefore, the ink is required to be liquid on impartment of recording signals.

The ink which is solid at room temperature is advantageously used for the purpose of prevention of excessive temperature rise by absorption of the latent heat of solid-liquid transition, or of prevention of evaporation loss of the solvent during standing at room temperature. Thus in the present invention, the inks may be employed which are liquified and ejected by application of thermal energy in correspondence with recording signals or which begin to solidify on deposition onto a printing medium.

Such an ink may be retained in a liquid or solid state in cavities or through-holes of a porous sheet or in opposition to the electrothermal transducer as described in JP-A-54-56847 or JP-A-6071260.

The most effective method of ink ejection is film boiling described above.

Further the ink jet head and the ink jet apparatus of the present invention are applicable not only to printers but also to dye printing machines for dying by ejecting ink onto cloth, and pen-plotters.

What is claimed is:

1. An ink jet head comprising a substrate having an energy-generating element on the surface of said substrate, a member forming an ink flow path aligned with said energy-generating element and communicating with a nozzle, and a ceiling plate covering said member forming an ink flow path, wherein said substrate and ceiling plate are sealed with a moisture-curing sealant composed mainly of an organic high polymer compound having an alkoxysilane moiety bonded to the organic high polymer compound through urethane linkage as represented by Formula (2):

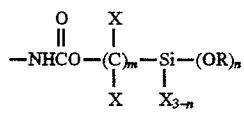

where X is hydrogen, methyl, ethyl, propyl or halogen; R is methyl, ethyl or propyl; n is 1, 2 or 3; and m is an integer of from 0 to 5.

2. An ink jet head comprising a substrate having an energy-generating element on the surface of said substrate, a member forming an ink flow path aligned with said energy-generating element and communicating with a nozzle, and a ceiling plate covering said member forming an ink flow path, wherein said substrate and ceiling plate are sealed with a moisture-curing sealant composed mainly of an organic high polymer compound having an alkoxysilane moiety bonded to the organic high polymer compound through urea linkage as represented by Formula (3):

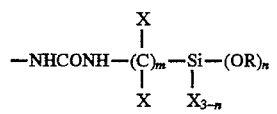

where X is hydrogen, methyl, ethyl, propyl or halogen; R is methyl, ethyl or propyl; n is 1, 2 or 3; and m is an integer of from 0 to 5.

3. An ink jet head comprising a substrate having an energy-generating element on the surface of said substrate, a member forming an ink flow path aligned with said energy-generating element and communicating with a nozzle, and a ceiling plate covering said member forming an ink flow path, wherein said substrate and ceiling plate are sealed with a moisture-curing sealant composed mainly of an organic high polymer compound having an alkoxysilane moiety bonded to the organic high polymer compound through ether linkage as represented by Formula (4):

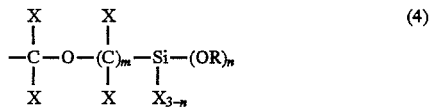

where X is hydrogen, methyl, ethyl, propyl or halogen; R is methyl, ethyl or propyl; n is 1, 2 or 3; and m is an integer of from 0 to 5.

4. The ink jet head according to any of claims 1, 2, or 3, wherein said substrate, member forming an ink flow path, and ceiling plate are sealed at a bonding interface between a member constructing an ink liquid chamber and a nozzle, and the substrate having an energy-generating element formed thereon; between a member constructing an ink liquid chamber and the nozzle, and the member forming an ink flow path; and between the member forming an ink flow path, and an ink tank unit.

5. The ink jet head according to any of claims 1, 2 or 3, wherein the organic high polymer compound is a polyether polyol.

6. The ink jet head according to any of claims 1, 2 or 3, wherein the organic high polymer compound is a polybutadienediol.

7. The ink jet head according to any of claims 1, 2 or 3, wherein the organic high polymer compound is a polycarbonatediol.

8. The ink jet head according to any of claims 1, 2 or 3, wherein the organic high polymer compound is a polyester polyol.

9. An ink jet head apparatus comprising an ink jet head for ejecting ink, an ink tank for supplying ink to the ink jet head, and an ink-ejection recovery device for recovery of the ink jet head, wherein a substrate having a heating element on the surface of said substrate, an ink flow path member aligned with said heating element and communicating with an ink discharge opening and a ceiling plate covering said ink flow path member, wherein said substrate and ceiling plate are sealed with a moisture-curing sealant composed mainly of an organic high polymer compound having an alkoxysilane moiety bonded to the organic high polymer compound through urethane linkage as represented by Formula (2):

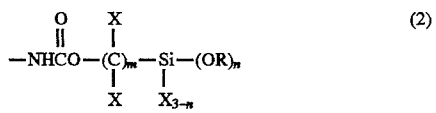

where X is hydrogen, methyl, ethyl, propyl or halogen; R is methyl, ethyl or propyl; and n is 1, 2 or 3; and m is an integer of from 0 to 5.

10. An ink jet head apparatus comprising an ink jet head for ejecting ink, an ink tank for supplying ink to the ink jet head, and an ink-ejection recovery device for recovery of the ink jet head, wherein a substrate having a heating element on the surface of said substrate, an ink flow path member aligned with said heating element and communicating with an ink discharge opening and a ceiling plate covering said ink flow path member, wherein said substrate and ceiling plate are sealed with a moisture-curing sealant composed mainly of an organic high polymer compound having an alkoxysilane moiety bonded to the organic high polymer compound through urea linkage as represented by Formula (3):

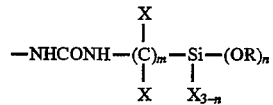

where X is hydrogen, methyl, ethyl, propyl or halogen; R is methyl, ethyl or propyl; n is 1, 2 or 3; and m is an integer of from 0 to 5.

11. An ink jet head apparatus comprising an ink jet head for ejecting ink, an ink tank for supplying ink to the ink jet head, and an ink-ejection recovery device for recovery of the ink jet head, wherein a substrate having a heating element on the surface of said substrate, an ink flow path member aligned with said heating element and communicating with an ink discharge opening and a ceiling plate covering said ink flow path member, wherein said substrate and ceiling plate are sealed with a moisture-curing sealant composed mainly of an organic high polymer compound having an alkoxysilane moiety bonded to the organic high polymer compound through ether linkage as represented by Formula (4):

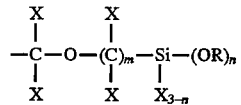

where X is hydrogen, methyl, ethyl, propyl or halogen; R is methyl, ethyl or propyl; n is 1, 2 or 3; and m is an integer of from 0 to 5.

12. The ink jet apparatus according to any of claims 9, 10 or 11, further comprising an ink tank, an ink jet head and a cap and a waste ink absorbent set in the ink-ejection recovery device sealed with said sealant.

13. The ink jet apparatus according to any of claims 9, 10 or 11, wherein the organic high polymer compound is a polyether polyol.

14. The ink jet apparatus according to any of claims 9, 10 or 11, wherein the organic high polymer compound is a polybutadienediol.

15. The ink jet apparatus according to any of claims 9, 10 or 11, wherein the organic high polymer compound is a polycarbonatediol.

16. The ink jet apparatus according to any of claims 9, 10 or 11, wherein the organic high polymer compound is a polyester polyol.

* * * * *

UNITED STATES PATENT AND TRADEMARK OFFICE
CERTIFICATE OF CORRECTION

PATENT NO.   : 5,650,805
DATED        : July 22, 1997
INVENTOR(S)  : Shimomura et al.

It is certified that error appears in the above-identified patent and that said Letters Patent is hereby corrected as shown below:

COLUMN 1:

Line 8, "systems" should read --system--.

COLUMN 3:

Line 56, "recovery" should read --recovery of--.

COLUMN 4:

Line 1, "view" should read --view of--; and
    Line 61, "aminopropyltrimethoxysialne;" should read --aminopropyltrimethoxysilane;--

COLUMN 7:

Line 2, "caster" should read --castor--.

UNITED STATES PATENT AND TRADEMARK OFFICE
CERTIFICATE OF CORRECTION

PATENT NO. : 5,650,805

DATED : July 22, 1997

INVENTOR(S) : Shimomura et al.

It is certified that error appears in the above-identified patent and that said Letters Patent is hereby corrected as shown below:

COLUMN 8:

Line 4, "However" should read --However,--; and
    Line 43, "to" should be deleted.

COLUMN 9:

Line 12, "Thereby" should read --Thereby,--.

COLUMN 10:

Line 41, "Parts" should read --parts--.

Signed and Sealed this

Seventeenth Day of March, 1998

Attest:

BRUCE LEHMAN

Attesting Officer

Commissioner of Patents and Trademarks